United States Patent
Aggarwal et al.

(10) Patent No.: US 11,151,386 B1
(45) Date of Patent: Oct. 19, 2021

(54) AUTOMATED IDENTIFICATION AND TAGGING OF VIDEO CONTENT

(71) Applicant: Amazon Technologies, Inc., Seattle, WA (US)

(72) Inventors: Abhinav Aggarwal, New Delhi (IN); Heena Bansal, Bathinda (IN); Lokesh Amarnath Ravindranathan, Bangalore (IN); Yash Pandya, Navi Mumbai (IN); Muhammad Raffay Hamid, Seattle, WA (US); Manivel Sethu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/809,421

(22) Filed: Mar. 4, 2020

(51) Int. Cl.
*G06K 9/00* (2006.01)
*H04N 21/44* (2011.01)
*G06F 16/78* (2019.01)
*G06F 16/75* (2019.01)
*G06F 16/783* (2019.01)

(52) U.S. Cl.
CPC ......... *G06K 9/00744* (2013.01); *G06F 16/75* (2019.01); *G06F 16/784* (2019.01); *G06F 16/7867* (2019.01); *G06K 9/00261* (2013.01); *G06K 9/00288* (2013.01); *H04N 21/44008* (2013.01)

(58) Field of Classification Search
None
See application file for complete search history.

(56) References Cited

U.S. PATENT DOCUMENTS

| | | | | | |
|---|---|---|---|---|---|
| 9,514,353 | B2* | 12/2016 | Zhang | ................... | G06K 9/6218 |
| 9,852,364 | B2* | 12/2017 | Liu | ........................ | G06K 9/629 |
| 2010/0008547 | A1* | 1/2010 | Yagnik | ..................... | G06F 16/70 |
| | | | | | 382/118 |
| 2011/0182482 | A1* | 7/2011 | Winters | .............. | G06F 16/5838 |
| | | | | | 382/116 |
| 2013/0111509 | A1* | 5/2013 | Guo | ........................ | H04H 60/65 |
| | | | | | 725/12 |
| 2017/0013309 | A1* | 1/2017 | Jallouli | ............ | H04N 21/44008 |
| 2017/0372165 | A1* | 12/2017 | Jouhikainen | ......... | G06K 9/4628 |

* cited by examiner

Primary Examiner — James R Marandi
(74) Attorney, Agent, or Firm — Eversheds Sutherland (US) LLP

(57) ABSTRACT

Systems, methods, and computer-readable media are disclosed for systems and methods for automated identification and tagging of video content. Example methods may include determining a first set of frames in video content, determining a first set of faces that appear in the first set of frames, and extracting first image content corresponding to respective faces of the first set of faces. Methods may include classifying the first image content into a first set of clusters, generating a second set of clusters comprising a second set of faces, wherein the second set of faces has less faces than the first set of faces, and determining a first actor identifier associated with a first face in the second set of clusters. Some methods may include determining second image content in the second set of clusters comprising the first face, and automatically associating the first actor identifier with the second image content.

18 Claims, 6 Drawing Sheets

AUTOMATED IDENTIFICATION AND TAGGING OF VIDEO CONTENT

BACKGROUND

Certain digital content, such as movies, television shows, and other video content may be available via streaming. For example, users may stream movies, television series, and so forth using streaming devices, such as smartphones, televisions, etc. Various actors may appear in different scenes of video content. Users may desire additional information regarding, for example, actors appearing in the video content or other aspects of the video content, such as interesting facts. In some instances, identification of such actors may rely on a manual process in which a human identifies the actors present in a scene, and information related to the manually identified actors can be presented to a user. However, such processes are time consuming and may be inaccurate. Accordingly, automated identification and tagging of video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
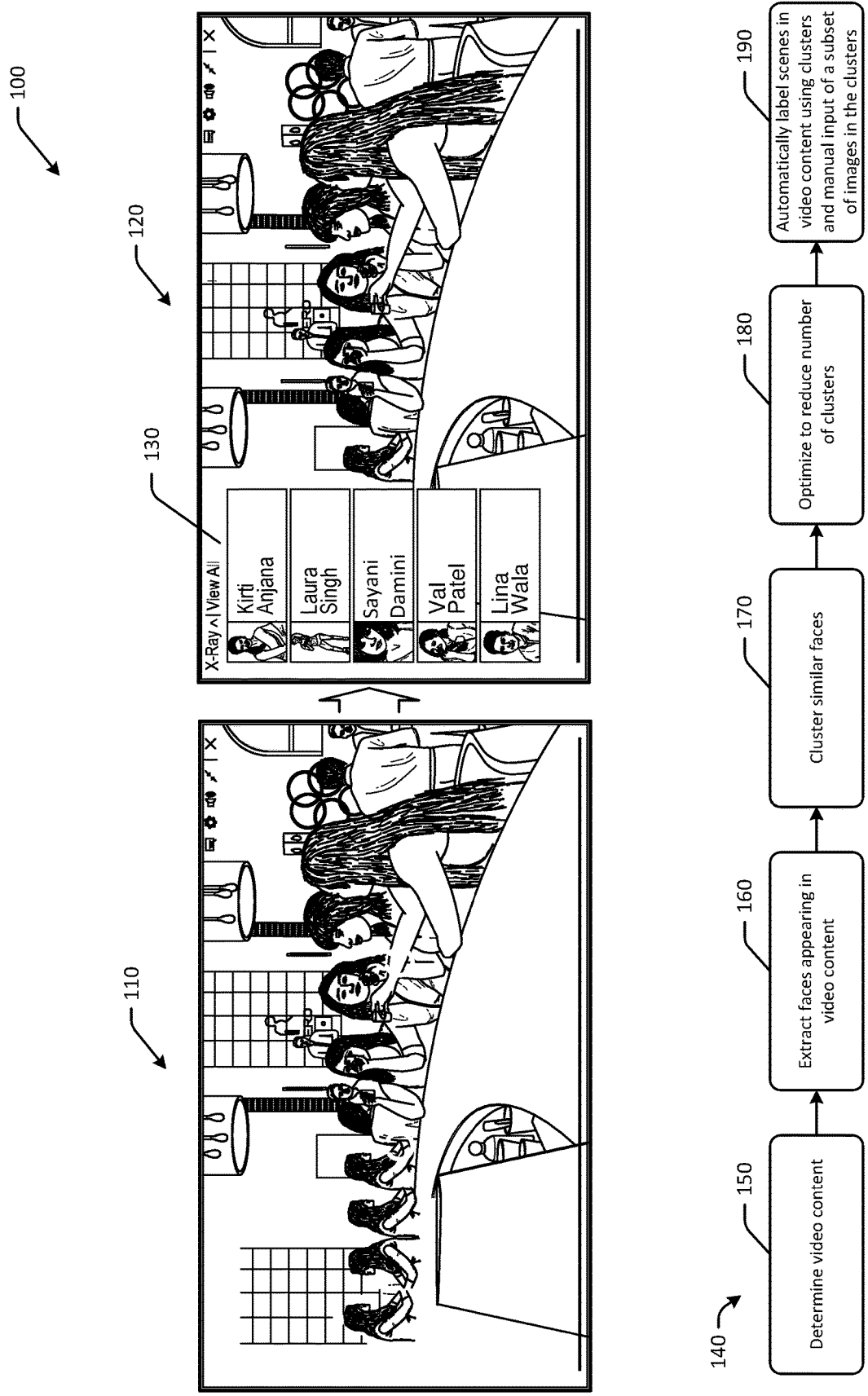
FIG. 1 is a schematic illustration of an example use case for automated identification and tagging of video content in accordance with one or more example embodiments of the disclosure.

Digital content may include video content, such as movies, television shows, streaming shows (e.g., made for Amazon Prime, Netflix, etc.), and other video content. Users may consume such video content using various devices. While consuming video content, users may see an actor that appears in the video content, and may be interested in additional information. For example, a user may see an actor in a scene, and may desire to learn other content in which the actor has played roles, biographical information for the actor, and so forth. The user may therefore see an actor in video content and may desire additional information.

Some content may include metadata related to actors appearing onscreen during portions of content. For example, certain content streaming services may provide features, such as X-Ray for Prime Video, that provide users with additional information regarding actors that appear in portions of content that are currently being consumed. However, such information may be manually generated. For example, to generate the data for such features, a manual operator may view the video content, watch for the actors that appear in the scenes, and manually identify the actors. Accordingly, the process may be time-consuming and prone to error. In addition, the metadata may be incomplete, as the manual operator may not provide manual identification for actors in every scene. For example, video content that is forty minutes long with twenty actors and eighty background personnel (e.g., extras, etc.) can have two to three different faces per 3-5 seconds of video. Manually combing through the video content is not only time-consuming, but can also create annotator fatigue (resulting in incompleteness).

Embodiments of the disclosure include systems and methods to automatically identify and tag (e.g., generate metadata, etc.) actors that appear in video content, such that users consuming the video content can view additional information regarding actors appearing onscreen during playback of the video content. Additional information may include actor identifiers, such as names, biographical information, trivia information, other content the actor has had roles in, and so forth. However, embodiments of the disclosure may not require manual identification and annotation of the video content. Instead, embodiments may implement various video and image processing techniques, along with particular sequences of clustering operations and optimizations, that result in a set of selected images of actors appearing in the video content that are presented for manual identification. Once the selected images are manually identified, metadata for the entire video content is automatically generated and time-coded, such that a user consuming the video content can accurately view information for the actors onscreen at any particular time. The set of selected images for manual identification may be the lowest number of faces (e.g., the images may be images of actor faces, etc.) needed for identification of the actors appearing in the content. A manual operator may therefore spend a few minutes identifying twenty (or any other number, based on the number of actors appearing in the video content) faces instead of watching the entire video content and manually annotating. Embodiments of the disclosure may therefore produce metadata that cannot be produced manually at the same speed, scale, or completeness because a manual operator may be unable to generate values like facial feature embeddings, facial similarity scores, and so forth that can be used to automate the process of annotation, and instead may have to rely on memory, human judgment, or other human factors.

In some embodiments, to determine actors that appear or are otherwise present in video content, the video content may be separated into frames and analyzed using one or more video/image processing algorithms, optional text processing algorithms, and/or optional audio processing algorithms. The video processing algorithms may include one or more facial detection algorithms to determine actors that appear in one or more frames, and/or other algorithms.

This disclosure relates to, among other things, devices, systems, methods, computer-readable media, techniques, and methodologies for automated identification and tagging of video content and presentation. Certain embodiments may automatically identify and map actors that appear in video content to actor identifiers in metadata that is time-coded, such that the actor information can be presented when the actor is onscreen, or during a scene in which the actor is present. Certain embodiments may generate a timeline of actors that appear in video content that can be used to improve an end user experience during consumption of the content. In some instances, machine learning (e.g., deep neural networks, long short term memory units and/or recurrent neural networks, etc.) may be used to identify various actors in video content that may appear at different angles or views.

Referring to FIG. 1, an example use case 100 for automated identification and tagging of video content is depicted in accordance with one or more example embodiments of the disclosure. For example, at a first instance 110, a user may be consuming video content. The video content may be a scene of a movie or other content corresponding to a club scene. The user may recognize one of the actors in the scene or may otherwise desire additional information. The user may therefore input a query regarding the actors in voice or text form. For example, in FIG. 1, the user may speak an utterance of "Alexa, show me more information on these actors," or may interact with the viewing device or remote control, such as by making a selection or pushing a button on the remote control.

At a second instance 120, metadata or additional information 130 regarding the actors appearing onscreen (or in the scene) may be presented. The additional information 130 may be presented as an overlay while the content is paused, or while content playback continues. The additional information 130 may include actor names and so forth, and more information may be viewed by interacting with any particular actor of interest. The additional information 130 may be automatically generated using the systems and methods described herein.

To automatically identify and tag actors in video content, an example process flow 140 is presented and may be performed, for example, by one or more content scanning engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 140 of FIG. 1.

At a first block 150, video content being presented may be determined. For example, in instances where a request or query for additional information is made while content is being presented at a device associated with a user, the remote server may determine the video content that is being presented. If there is no video content being presented, the remote server may determine a title or identifier of content that may be included in a user request.

At a second block 160, the remote server may extract faces appearing in the video content. For example, the remote server may determine a first set of frames in video content, the first set of frames including a first frame, a second frame, a third frame, and so forth. The second frame may be between the first frame and the third frame. The remote server may process one or more of the frames to determine whether a face is present in the frame. For example, the remote server may determine, using one or more facial recognition algorithms, a first human face present in the first frame. The remote server may extract a first portion of the first frame that includes the first human face. For example, the remote server may generate a bounding box about the face and extract the face as image content. Some or all of the faces appearing in the respective frames of the video content may be extracted. For example, the remote server may determine, using the one or more facial recognition algorithms, a second human face present in the third frame, and may extract a second portion of third frame that includes the second human face.

At a third block 170, the remote server may cluster similar faces. For example, based at least in part on facial features that may be detected during facial recognition, the remote server may determine faces that match a threshold similarity (e.g., 80%, 90%, etc.), and may cluster the faces together. Additional context, such as spatio-temporal features, may be used to improve classification. Classification may be agnostic as to facial pose, brightness, blur, and so forth. Prior to clustering, or after clustering, the extracted faces may optionally be processed for normalization. For example, the remote server may process the first portion of the first frame to generate a transformed version of the first human face, and may process the second portion of the third frame to generate a transformed version of the second human face. The remote server may generate, based at least in part on the transformed version of the first human face, a first cluster of portions of frames that respectively include human faces that are similar to the first human face, and may generate, based at least in part on the transformed version of the second human face, a second cluster of portions of frames that respectively include human faces that are similar to the second human face.

At a fourth block 180, the remote server may optimize to reduce the number of clusters and/or to reduce the number of faces in respective clusters or in aggregate. For example, the remote server may process the first cluster and the second cluster using an inter-cluster optimization algorithm and/or an intra-cluster optimization algorithm to generate a reduced set of human faces that appear in the video content. The reduced set of human faces may include a third cluster that includes the first human face and the second human face, which may indicate that the faces are of the same actor. The remote server may generate a request for manual identification of the first human face. The manual operator may provide the identifier, and the remote server may determine a first actor name associated with the first human face.

At a fifth block 190, the remote server may automatically label scenes in video content using clusters and manual input of a subset of images in the clusters. For example, if the manual operator identifies the first actor as the first actor name, the remote server may automatically associate the first actor name with the second human face and other human faces in the third cluster. To select a representative image from a cluster for manual identification, the remote server may generate an impact score. The impact score may represent the number of images that can be automatically labeled as a result of the identification of the image itself, and may be relative to other images. For example, if identification of a first image will lead to automatic identification of 500 images, compared to automatic identification of 200 images for a second image, the first image may have a greater impact score than the second image. The remote server may select a number of images for identification that results in a threshold amount (e.g., actor identification threshold, etc.) of the total number of faces in the video content being identified (e.g., 70% of all extracted faces, 80% of all extracted faces, etc.). For example, the remote server may determine that identification of the first human face and the third human face will result in satisfaction of an actor identification threshold for the video content, and may therefore determine which human faces are to manually identified and so forth. The remote server may then generate metadata associated with the video content, where the metadata comprises a set of actor names and corresponding images that appear in discrete scenes of the video content, and may cause presentation of the metadata during playback of the video content, as illustrated at the second instance.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain actors and may use one or more machine learning modules or algorithms. As a result of improved functionality, actor appearance timelines may be generated and may be used to facilitate providing of information related to actors responsive to user requests. Embodiments of the disclosure may improve computing efficiency and bandwidth by reducing a set of actor identifiers that need to be manually identified. Some embodiments may automatically identify, cluster, and optimize faces using criteria that may not be manually generated. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
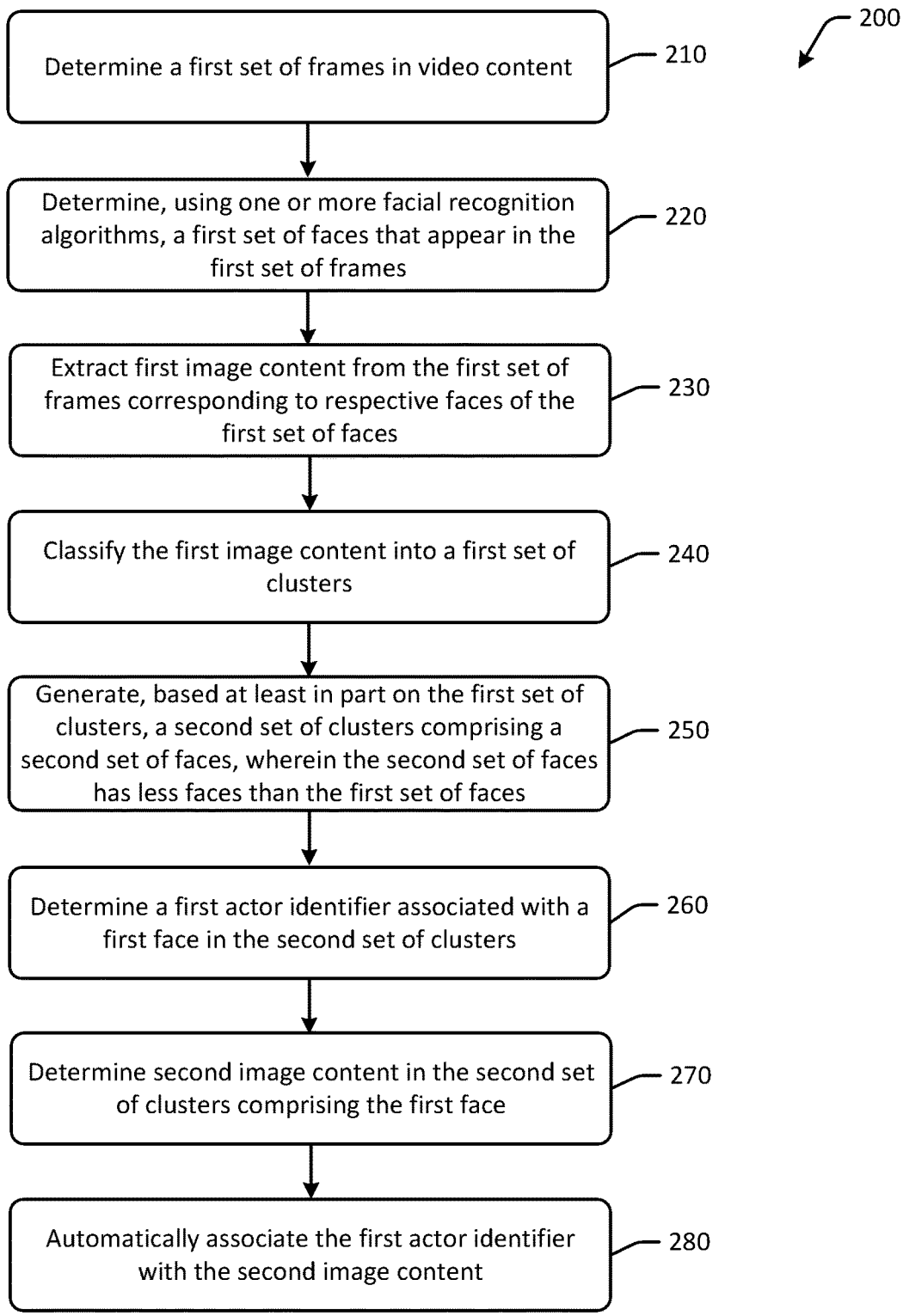
FIG. 2 is a schematic illustration of an example process flow for automated identification and tagging of video content in accordance with one or more example embodiments of the disclosure.

FIG. 2 depicts an example process flow 200 for automated identification and tagging of video content in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first set of frames in video content. For example, a content processing engine and/or one or more content scanning modules at a remote server may determine a first set of frames in video content. In some embodiments, frames of video content may be extracted from a video file corresponding to the video content. Frames may be extracted in sequence and may be analyzed or processed using one or more image processing algorithms.

In some instances, the remote server may determine that certain frames correspond to a certain scene in the video content. For example, the remote server may determine that the first set of frames correspond to a scene of the video content. The remote server may process the first set of frames as a cluster, or may determine objects that appear in any of the frames in the cluster as a whole. For example, the remote server may extract and/or analyze individual frames of video content to determine whether the frames are part of the same scene or a different scene. In some embodiments, every other frame of video content may be extracted and/or analyzed (e.g., every second frame or alternating frames, etc.). Analysis of frames may include processing images using one or more object recognition algorithms, determining pixel color values, comparing certain portions of frames to previous or subsequent frames in the video, and the like. In one example, a facial recognition algorithm may be used to determine that there a human face is present or otherwise appears in a first frame of a video. The video content to which the first set of frames corresponds may be a single contiguous portion of video content, such as that of a movie, or in some instances, may be separate video segments, such as multiple television show episodes and the like.

At block 220 of the process flow 200, computer-executable instructions stored on a memory of a device, such as a remote server or a user device, may be executed to determine, using one or more facial recognition algorithms, a first set of faces that appear in the first set of frames. For example, the content processing engine and/or one or more content scanning modules at a remote server may determine, using one or more facial recognition algorithms, a first set of faces that appear in the first set of frames. Analysis of frames may include processing images using one or more facial recognition algorithms, determining pixel color values, comparing certain portions of frames to previous or subsequent frames in the video, and the like.

For example, some or all of the frames in the first set of frames may be processed or otherwise analyzed to determine whether one or more human faces appear in any particular frame. In some embodiments, every other frame, or every second frame, may be analyzed to determine the presence of any human faces. In some embodiments, the portion of the respective frames in which a detected human face appears may be identified. Using one or more facial recognition algorithms, human faces may be detected regardless of a pose of the human face in the particular frame (e.g., side pose, front pose, angled pose, etc.). In some embodiments, to determine the first set of faces that appear in the first set of frames, the remote server may identify every other frame in the first set of frames, such as every second frame or alternating frames, and may determine, using one or more facial recognition algorithms, the first set of faces that appear in every other frame.

At block 230 of the process flow 200, computer-executable instructions stored on a memory of a device, such as a remote server or a user device, may be executed to extract first image content from the first set of frames corresponding to respective faces of the first set of faces. For example, the content processing engine and/or one or more content scanning modules at a remote server may extract first image content from the first set of frames corresponding to respective faces of the first set of faces. In some embodiments, a bounding box may be generated about a detected human face in a frame. The bounding box may define the portion of the frame that is to be extracted. The extracted content may be image content and may include the detected human face. Some or all of the portions of a frame in which human faces are detected may be extracted. For example, if more than one human face is present in the frame, some or all of the human faces may be extracted as separate image content from the respective frames. The faces appearing in the analyzed frames of the video content may be extracted as image content and aggregated. For example, tens of thousands of images (or more or less depending on the length and type of content, etc.) of faces that appear in the video content may be extracted and aggregated.

In some embodiments, the extracted faces (e.g., the image content corresponding to the faces extracted from the frames of the video content, etc.) may be processed using one or more image processing techniques to normalize the images. For example, the image content may be processed using one or more image transformation algorithms to normalize the respective faces. Normalization may allow for matching of faces or determining similar faces regardless of brightness, quality, pose, face size, etc. Normalization may include using image processing tools such as blurring, sharpening, detailing, masking, and/or other tools.

At block 240 of the process flow 200, computer-executable instructions stored on a memory of a device, such as a remote server or a user device, may be executed to classify the first image content into a first set of clusters. For example, the content processing engine and/or one or more content scanning modules at a remote server may classify the first image content into a first set of clusters. For example, the first image content may include the faces extracted from the video content. The respective faces may be classified into a first set of clusters using, for example, one or more coarse clustering or other weakly supervised and/or large scale clustering techniques. For example, the remote server may classify the image content into a set of clusters using one or more course clustering algorithms.

Classification into different clusters may be used to aggregate similar faces, or matching faces, into the same clusters. In some embodiments, spatial and/or temporal features may be used to cluster faces (or more accurately, faces in image content). For example, faces extracted from frames adjacent to each other are more likely to be of the same actor than faces separated by thousands of frames. Accordingly, spatial and/or temporal frames may be used to classify faces. In some embodiments, the remote server may determine matching faces in the first set of clusters using spatial and temporal data associated with the video content, such as timestamp data, frame identifier data, subtitle data, audio data associated with the video content, and/or other data.

In some embodiments, the detected faces may be clustered via facial embeddings, where an initial number of clusters may be greater than a total number of characters in a cast list corresponding to the video content (e.g., 5 times greater than to about twelve times greater than the cast list, etc.). Some algorithms may treat each face as a singleton cluster, after which pairs of clusters which have the closest distance may be successively merged until all clusters have been merged. The result is a tree-based representation of the objects, known as dendrogram, in some embodiments. An output of 256 clusters may be determined. Other embodiments may have a different number of clusters.

At block 250 of the process flow 200, computer-executable instructions stored on a memory of a device, such as a remote server or a user device, may be executed to generate, based at least in part on the first set of clusters, a second set of clusters comprising a second set of faces, wherein the second set of faces has less faces than the first set of faces. For example, the content processing engine and/or one or more content scanning modules at a remote server may generate, based at least in part on the first set of clusters, a second set of clusters comprising a second set of faces, wherein the second set of faces has less faces than the first set of faces. The remote server may determine a reduced set of clusters by consolidating the number of faces in the first set of faces to remove duplicates and to otherwise aggregate similar faces into the same cluster, regardless of facial pose, etc. The remote server may therefore optimize the first set of clusters to generate the second set of clusters. The second set of clusters may include a second set of faces that has a lower number of faces than the first set of faces. As a result of the optimization, the number of detected faces may be consolidated into a reduced number of faces. In some embodiments, the second set of clusters may have fewer clusters than the first set of clusters. To generate the second set of clusters, in some embodiments, the remote server may process the first set of clusters using an inter-cluster optimization algorithm (e.g. which may be used to consolidate the same face in different poses, etc.), and may process the first set of clusters using an intra-cluster optimization algorithm (e.g., which may be used to remove duplicate faces, etc.). The remote server may therefore generate the second set of clusters using output of the inter-cluster optimization algorithm and the intra-cluster optimization algorithm.

Optimization of the first set of clusters may yield, in the second set of clusters, a set of faces that appear in the video content that are the most unique or different relative to each other. In some embodiments, optimization may include consideration of factors such as shot patterns and temporal information for finding similar faces within a cluster. For example, spatio-temporal information may be used to determine a similar set of actors for each cluster. Intersection-over-Union measure and frame time stamp difference may be used to compute face matching across frames. Each face group may be represented with a single representation. Facial embeddings distance may be used to determine the similarity of the images and/or determine single representations of face groups. Some embodiments may use cosine similarity as a measure of distance. To further reduce the number clusters and/or faces, some embodiments may employ further processing of density-based spatial clustering of applications with noise algorithm, so as to match faces. The output of the optimization process, which may be the second set of clusters, may include some or all of the unique faces that appear in the video content.

At block 260 of the process flow 200, computer-executable instructions stored on a memory of a device, such as a remote server or a user device, may be executed to determine a first actor identifier associated with a first face in the second set of clusters. For example, the content processing engine and/or one or more content scanning modules at a remote server may determine a first actor identifier associated with a first face in the second set of clusters. In some embodiments, determination of the first actor identifier may be determined as a result of user input. For example, the remote server may generate a request for manual identification of a particular face from the second cluster. A user may manually identify the particular face, and the remote server may therefore determine the first actor identifier associated with the first face in the second set of clusters. In other embodiments, the remote server may automatically perform an image search in one or more databases to automatically identify an actor identifier without user input. For example, if the same actor appears in other content for which identification has been completed, the remote server may automatically determine the actor identifier.

At block 270 of the process flow 200, computer-executable instructions stored on a memory of a device, such as a remote server or a user device, may be executed to determine second image content in the second set of clusters comprising the first face. For example, the content processing engine and/or one or more content scanning modules at a remote server may determine second image content in the second set of clusters comprising the first face. The second image content may be in the same cluster as the first image content with the first face. In some embodiments, each of the images in a cluster may have faces for the same actor, or faces that match a threshold level of similarity, such as about 80% or another threshold.

At block 280 of the process flow 200, computer-executable instructions stored on a memory of a device, such as a remote server or a user device, may be executed to automatically associate the first actor identifier with the second image content. For example, the content processing engine and/or one or more content scanning modules at a remote server may automatically associate the first actor identifier with the second image content. Because the same face is depicted in the second image content, the remote server may automatically associate the second image content with the first actor identifier, without manual identification of the face in the second image content. In some embodiments, all of the faces similar to the first face may be associated with the first actor identifier, and may therefore leverage the identification of a first face across multiple images and/or scenes of the video content. User involvement may therefore be minimized or eliminated from the process, and faces appearing in the entire video content may be quickly identified and data may be propagated with minimal user interaction.

Figure 3:
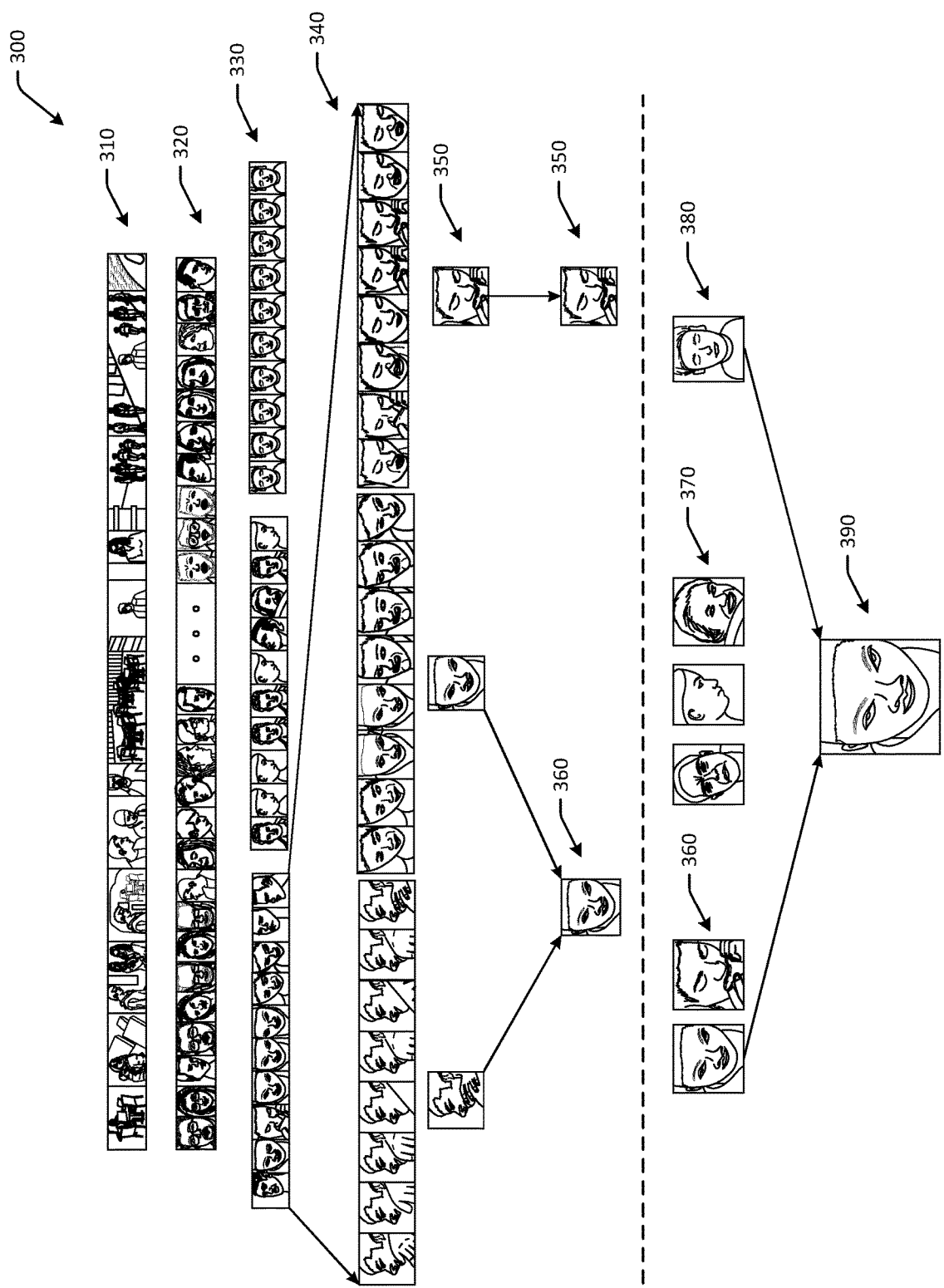
FIG. 3 is a schematic illustration of example processing and clustering of video content in accordance with one or more example embodiments of the disclosure.

FIG. 3 is a schematic illustration of example processing and clustering 300 of video content in accordance with one or more example embodiments of the disclosure. In FIG. 3, video content 310 may include a number of frames that form the video content. The video content may be continuous or may span multiple segments or episodes. Embodiments of the disclosure may extract the frames of the video content from a video file, for example.

Some or all of the frames may be processed to detect whether human faces appear in the respective frames. Certain embodiments may process every other frame (e.g., every second frame, etc.) using one or more facial recognition algorithms to determine whether human face(s) are present in the respective frame. The detected faces may be extracted as image content from the respective frames in which they appear, and may be aggregated as detected faces 320. Some of the detected faces 320 may be of the same actor, as the same actor may appear in a number of frames of the video content 310. For example, facial detection of faces in the frames may be performed using a multi-task cascaded neural network model that may be pre-trained. In some embodiments, a remote server may generate facial feature embeddings for each detected face using the same or a different model. Similar faces appearing in the video content may be grouped. Of the groups of similar faces, the best representative face may be determined and selected. Some embodiments may use face metadata from the video content 310, distance functions, and/or clustering algorithms for grouping faces. To determine the best representative face, certain criteria may be automatically evaluated using individual scores, such as pose of the face scores, brightness scores, sharpness scores, face size scores, quality scores, and/or other values. Some embodiments may apply non-maximal suppression to remove possible duplicate face bounding boxes when extracting faces from frames. Embodiments may utilize face recognition models for generating facial features for comparing faces.

The detected faces 320 may be classified or categorized into a number of clusters 330, such as 256 clusters or any other number of clusters. In one example, faces may be clustered using balanced iterative reducing and clustering using hierarchies algorithms or other unsupervised algorithms on facial embeddings. Each cluster 330 is intended to have faces of the same actor, even if there are multiple clusters for the same actor. For example, a first cluster 340 may include images of faces of the same actor in a number of different poses as the actor appears throughout the video content 310. Accordingly, the detected faces may be coarse clustered. Faces may be clustered regardless of blur, brightness, face pose, and/or other factors. In some embodiments, detected faces may be ranked based at least in part on the screen presence using the number of faces present in the face groups.

Embodiments may optimize clusters to remove redundant faces within each cluster. For example, the clusters may be processed to remove redundant faces. In some embodiments, to generate a reduced set of clusters, a remote server may process the first set of clusters 330 using an inter-cluster optimization algorithm to consolidate the same face in different poses, and may process the first set of clusters 330 using an intra-cluster optimization algorithm to remove duplicate faces. Output of the inter-cluster optimization algorithm and the intra-cluster optimization algorithm may be used to reduce the number of unique faces for manual identification.

To remove redundant faces, spatio-temporal information and/or facial embeddings may be determined for each face to remove redundant faces within each cluster. For example, a subset of the first cluster 340 may be optimized to reduce the number of faces in the subset to a first face 360, and a second face 350 (which may be of the same actor) may be maintained due to its lack of similarity to the first face 360. Accordingly, the number of faces in each cluster may be reduced. This process may be intra-cluster optimization.

Similarly, facial features may be used to remove redundancy across multiple clusters, which may be inter-cluster optimization. For example, as illustrated below the horizontal dashed line in FIG. 3, the first cluster 340, a second cluster 370, and a third cluster 380 may be processed to remove duplicates or redundant faces within multiple groups, so as to consolidate a complete set of unique faces 390. The set of unique faces 390 may be submitted for manual identification, and determined actor identifiers can be propagated back to other images of the face in the clusters (e.g., using a reverse hierarchy, etc.).

Optimal faces may be selected based at least in part on face quality estimation, facial pose, and/or a face brightness metric. In some instances, to select a face for manual identification or to be representative of a cluster, the image may satisfy one or more conditions, including a facial quality score better than a threshold, a rank with respect to the score which is within a minimum value, and/or it has a percentile score is greater than a minimum percentile value.

Figure 4:
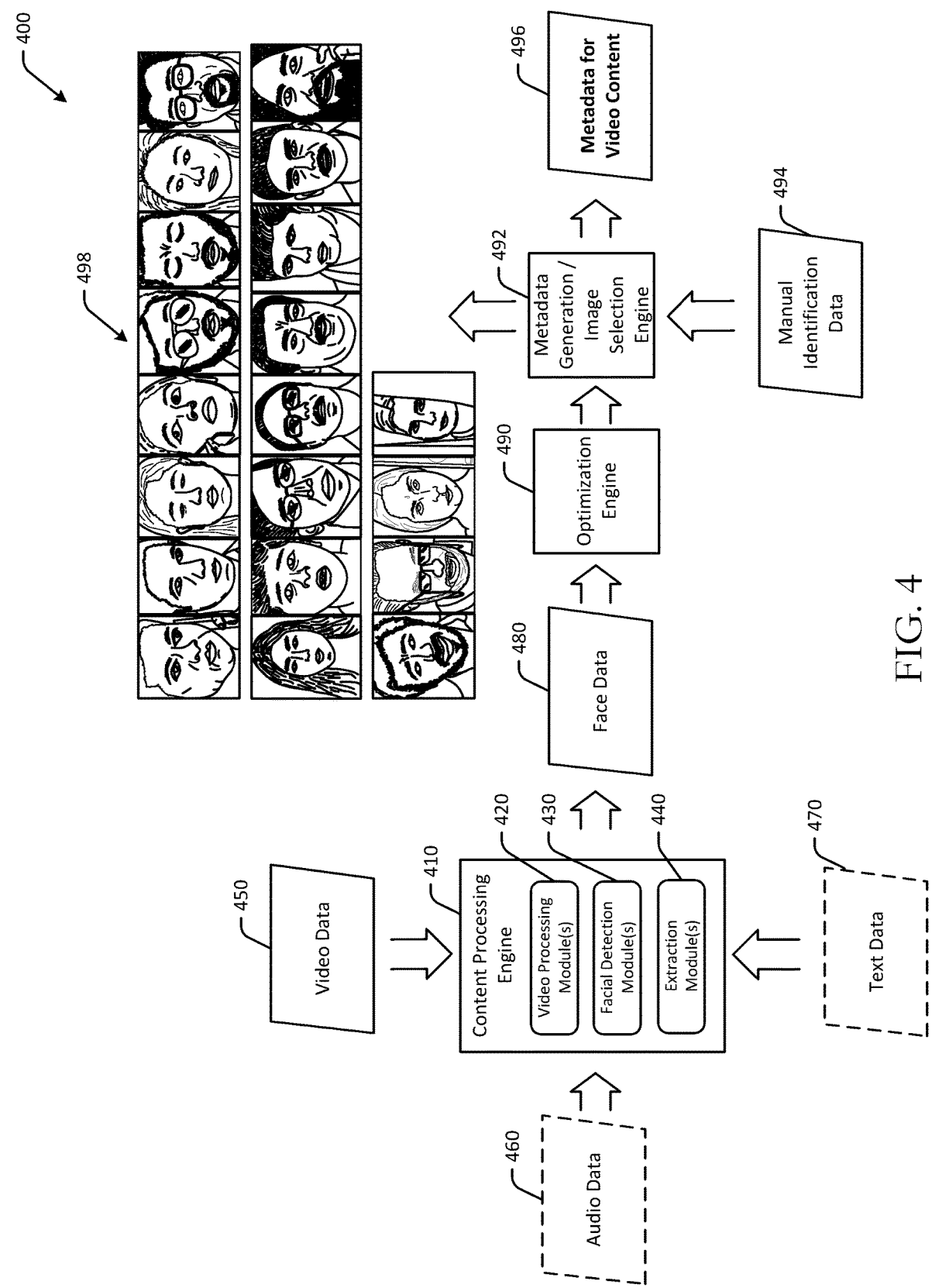
FIG. 4 is a schematic illustration of an example data and process flow for automated identification and tagging of video content in accordance with one or more example embodiments of the disclosure.

FIG. 4 is a schematic illustration of an example data and process flow 400 for automated identification and tagging of video content in accordance with one or more example embodiments of the disclosure. Different embodiments may include different, additional, or fewer inputs or outputs than those illustrated in the example of FIG. 4.

In FIG. 4, the example data and process flow 400 is schematically depicted. A content processing engine 410 and/or one or more content scanning module(s) may be configured to detect or determine one or more faces present in digital content, which can be used to generate metadata for video content that provides users with additional information regarding actors present in a scene during consumption. The content processing engine 410 may be stored at and/or executed by one or more remote servers. The content processing engine 410 may include one or more modules or algorithms, and may be configured to identify or determine the presence of one or more actors in video content.

For example, the content processing engine 410 may include one or more video processing modules 420, one or more facial detection modules 430, and/or one or more extraction modules 440. Additional or fewer, or different, modules may be included. The video processing module(s) 420 may be configured to process and/or analyze video content. For example, the video processing module(s) 420 may be configured to determine frames or sets of frames of video content and may be configured to detect certain features, such as human faces and/or corresponding frames or timestamps for different scenes in which the faces occur in the video content. For example, a video file for a movie may include a first frame, a second frame, and so forth. The video processing module(s) 420 may optionally be configured to detect or analyze frames in video content to determine which frames correspond to the same scene. For example, the video processing module(s) 420 may include facial recognition and/or human face detection algorithms that can be used to identify people or themes in certain locations over frames or segments of the video content, which may not always be consecutive. For example, a scene may be briefly interrupted by a flashback or cut to a different story, and may resume thereafter. Video processing module(s) 420 may include one or more object recognition algorithms configured to detect at least one of predefined objects, predefined scenery (e.g., certain locations, etc.), and the like.

The facial detection module(s) 430 may be configured to process and/or analyze frames of video content to determine whether human faces are present in a portion of individual frames, and if so, where in the frame the faces are present. In some instances, the facial detection module(s) 430 may be configured to generate a composite image of a face using multiple views and/or images of the same face across a number of frames. The facial detection module(s) 430 may be configured to perform an image matching process to determine whether there is a threshold match between an image of face identified in a first frame and a corresponding face identified in a second frame. A threshold match may be represented as a predetermined probability value indicative of a likelihood that two images are of the same face.

The extraction module(s) 440 may be configured to extract detected faces from the frames in which they appear. The extracted faces may be in the form of image content and may be aggregated, such that some or all of the faces extracted from the video content may be stored in one or more files. The extraction module(s) 440 may be configured to analyze and/or process frames to determine whether a human face is present in the frame, and if so, whether the human face corresponds to a known actor. The extraction module(s) 440 may be configured to perform an image-to-image analysis to determine whether a threshold match is present. The extraction module(s) 440 may determine a character name of a character in the video content, the name of the actor portraying the character, and/or other data that may be used by a user to identify an object. In some embodiments, the content processing engine 410 may be configured to determine relationships between the detected actors and/or characters and the detected faces.

The content processing engine 410 may receive one or more inputs that may be used to generate one or more outputs, such as face data 480. For example, the content processing engine 410 may receive one or more of video data 450 associated with the video content, optional audio data 460 that may be associated with the video content and used to identify actors, and/or optional text data 470 that may be associated with the video content and used to identify actors (e.g., via subtitles, etc.). In some embodiments, the video data 450, audio data 460, and/or text data 470 may be extracted from a content file.

The content processing engine 410 may process the respective data associated with the content for identification of faces present in the video content. For example, the video data 450 may be processed using one or more of the video processing module(s) 420, the facial detection module(s) 430, and/or the text processing module(s) 440. Likewise, the audio data 460 and/or the text data 470 may be processed using one or more of the modules or algorithms of the content processing engine 410.

Using one or more algorithms or modules, the content processing engine 410 may output face data 480. The face data 480 may represent the different faces that appear in the video content (e.g., video data 450, etc.). The face data 480 may be structured or unstructured data, and may or may not be sorted. For example, faces of the same actor that appear in adjacent frames or at a similar timestamp (e.g., within a second, etc.) may be extracted and stored in the face data 480, even though the faces may likely be of the same actor. The face data 480 may include timestamps representing a point in the video content at which the face appears.

The face data 480 may be input at an optimization engine 490 and/or one or more optimization module(s). The optimization engine 490 may be configured to optimize the face data 480. For example, the optimization engine 490 may be configured to cluster the faces in the face data 280 using one or more coarse clustering or large scale clustering techniques. The optimization engine 490 may be configured to optimize the clustered faces using one or more of inter-cluster optimization or intra-cluster optimization to reduce the number of total faces by eliminating duplicates and/or similar faces (e.g., faces of the same actor, etc.). The output of the optimization engine 490 may be a reduced set of clusters of the faces detected in the video content, and, in some instances, may be a reduced set of faces for identification.

The output of the optimization engine 490 may be input at a metadata generation/image selection engine 492. In some embodiments, functionality of the optimization engine 490 and the metadata generation/image selection engine 492 may be combined into one engine or module, or may be separated across more than two engines or modules. The metadata generation/image selection engine 492 may be configured to select a subset of images from the reduced cluster of images for manual identification of the actor in the image. For example, the metadata generation/image selection engine 492 may be configured to determine an impact score associated with identification of a particular image, where the impact score represents a number of other images or faces that can be identified automatically as a result of identification of the image. Higher impact scores may be preferable, as a reduced number of images may need to be manually identified.

To determine impact scores, the metadata generation/image selection engine 492 may determine a number of images in the second set of clusters that are similar to the first face (e.g., using the hierarchy of images, etc.), and may determine an impact score for the first face using the number of images. Based at least in part on the impact score, the metadata generation/image selection engine 492 may select the first face for identification.

Impact scores may be generated for one or more images extracted from the video content. For example, the metadata generation/image selection engine 492 may determine, using an image processing hierarchy, a first number of human faces associated with a first human face extracted from the video content, where the associated human faces are similar to the first human face. The metadata generation/image selection engine 492 may determine a first impact score for the first human face based at least in part on the first number of human faces, where the first impact score represents a number of human faces that can be automatically identified if the first human face is identified. For example, the identification of the first face can be propagated to additional faces that are similar to the first face. The metadata generation/image selection engine 492 may determine, using the image processing hierarchy, a second number of human faces associated with a third human face, where the associated human faces are similar to the third human face, and may determine a second impact score for the third human face based at least in part on the second number of human faces, where the third impact score represents a number of human faces that can be automatically identified if the third human face is identified. The metadata generation/image selection engine 492 may determine that the first impact score is greater than the second impact score, and may therefore select the first human face for manual identification.

Amongst the images with a threshold impact score, the metadata generation/image selection engine 492 may be configured to select certain images 498 using criteria such as a brightness level, a pose of the face, a quality of the image, and/or other factors, so as to increase the likelihood that a manual operator can accurately identify the actor. After the images for manual identification have been selected, the metadata generation/image selection engine 492 may optionally select the first face based at least in part on a facial pose of the face and a brightness level of the corresponding image content (and/or other selection criteria) and may generate a request for manual identification of the first face. For example, the metadata generation/image selection engine 492 may select a set of images 498 for manual identification based at least in part on the characteristics of the individual images, as well as the corresponding impact scores. For example, if identification of the set of images 498 results in identification of a threshold amount (e.g., 70%, 75%, 80%, 85%, 90%, etc.) of the total faces in the video content being identified, the metadata generation/image selection engine 492 may determine that identification of each of the set of images 498 is sufficient for the video content.

The metadata generation/image selection engine 492 may receive manual identification data 494 corresponding to the identification of the actors in the respective set of images 498. The metadata generation/image selection engine 492 may determine that a threshold amount of the first set of faces (e.g., all of the faces detected in the video content, etc.) have been identified. The metadata generation/image selection engine 492 may therefore generate or otherwise output metadata 496 for the video content that includes actor identifiers associated with respective frames, such that actor identifiers can be presented during playback of the video content.

As a result of the selected images 498 and the corresponding identification, metadata for the entire video content (which may include tens of thousands or more of faces) may be generated with minimal manual input. Manual operators may be presented with images that satisfy certain selection criteria, and may quickly identify the actors. The identification data can be propagated to some or all of the scenes or frames in which the actor appears, thereby removing the need for manual operators to analyze every scene in the video content to generate the metadata.

Figure 5:
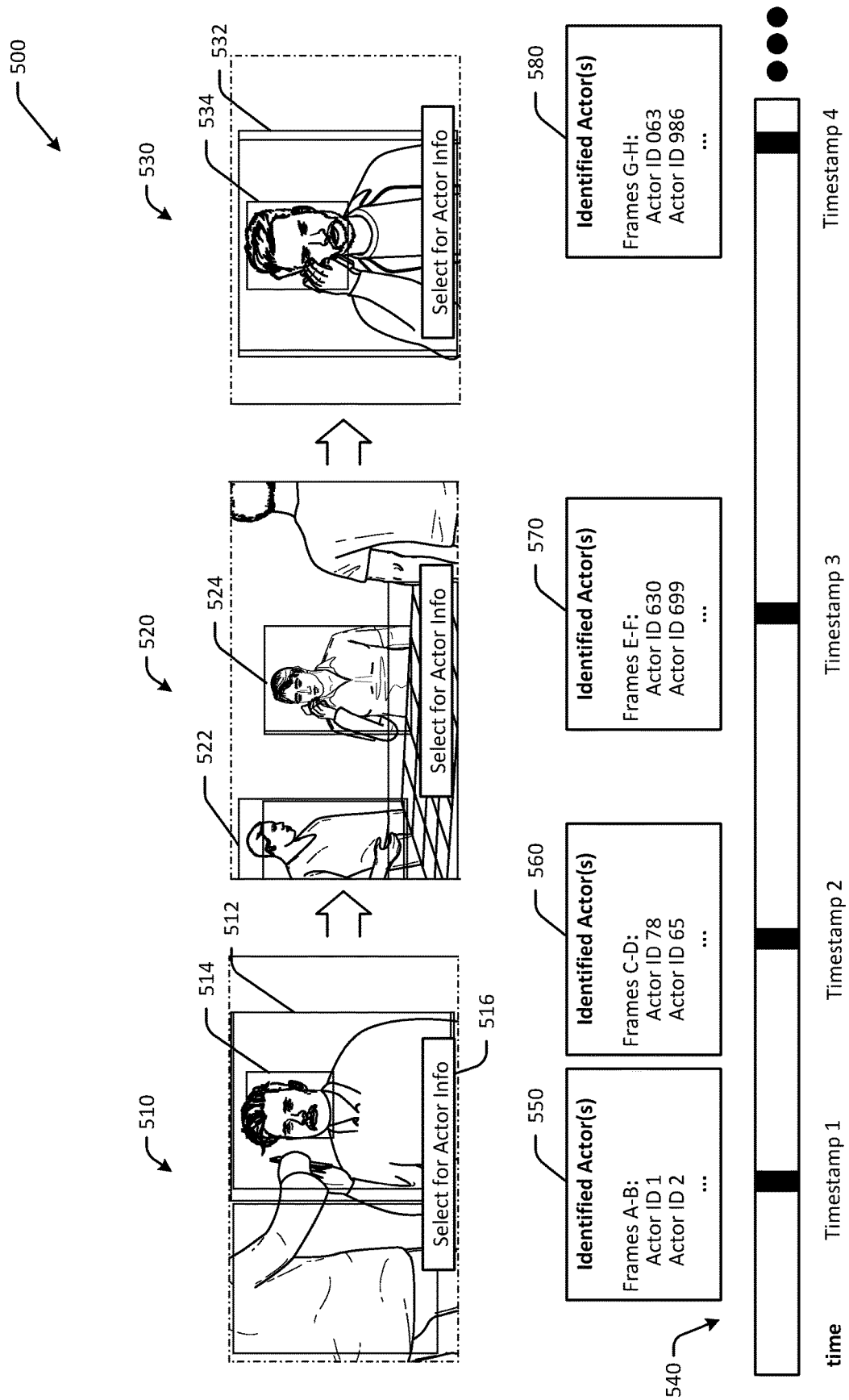
FIG. 5 is a schematic illustration of example use case for automated identification and tagging of video content in accordance with one or more example embodiments of the disclosure.

FIG. 5 is a schematic illustration of example use case 500 for automated identification and tagging of video content in accordance with one or more example embodiments of the disclosure. While example embodiments of the disclosure may be described in the context of frames or images, it should be appreciated that the disclosure is more broadly applicable to any suitable portion of digital content.

In FIG. 5, a user may be consuming video content on a device, such as a mobile device, a television, a streaming device, or another type of device. The video content may be associated with metadata that includes actor information, such as actor names, backgrounds, and/or other information for the different scenes in the video content. For example, actor information for actors appearing in a scene being viewed by the user may be included in the metadata.

As the video content is played back, at a first instance 510, the user may consume the content. A first actor 512 may appear onscreen in the video content. If the user desires to learn more about the actor, the user may select an option 516. The option 516 may cause presentation of additional information about the actor(s) appearing onscreen. The format of additional presentation may be similar to that illustrated in FIG. 1. The option 516 may be a persistent option or may appear based at least in part on a user interaction with the device or a controller.

If the user selects the option 516, actor information for the first actor 512, along with a headshot 514 of the first actor 512 and/or any other data included in the metadata, may be presented as an overlay. Video content playback may continue or may be paused during presentation of the metadata.

To determine the metadata to be presented at any particular time during playback of the video content, the device and/or a remote server may use a metadata timeline 540 that may have associations between particular metadata and timestamps. For example, at a first timestamp 550, the metadata may include actor information, such as actor names, and may optionally include frame identifiers for frames during which the metadata should appear. In other embodiments, timestamps may be used instead of, or in addition to, frame identifiers to determine when certain metadata is to be presented. For example, a remote server or a device may determine that a first actor identifier is associated with a first frame in a set of frames, and may determine a timestamp associated with the first frame. The remote server may associate the timestamp with the first actor identifier, and may cause presentation of the first actor identifier at the timestamp during playback of the video content.

As the user continues consuming the video content, or as playback of the video content continues, at a second instance 520, a second actor 522 and a third actor 524 may appear onscreen. If the user selects the option 516 at the second instance 520, actor information for the second actor 522 and the third actor 524 may be presented. Similarly, at a third instance 530, a fourth actor 532 may appear onscreen. If the user selects the option 516 at the third instance 530, actor information (which may include a headshot 534) for the fourth actor 532 may be presented.

The metadata timeline 540 may include, at a second timestamp 560, metadata corresponding to actors appearing onscreen at or near the second timestamp 560, and so forth. The metadata timeline 540 may be determined by a remote server for the video content and the actors that appear in the video content. Such timelines may be actor appearance timelines, and may helpful in determining actor information that a user may be interested in when a user is consuming the video content in real time. For example, based on a point in the video content at which the user is viewing, the remote server may be more reliably able to determine a specific actor appearing onscreen using the additional data of the point at which the user is watching when the request for additional information was made. The metadata timeline 540 may indicate at a third timestamp 570, a third set of actors that appear, at a fourth timestamp 580, a fourth set of actors appears, and so forth.

Although discussed in the context of contiguous video content, such as a movie, other embodiments may generate metadata timelines across multiple pieces or segments of video content, such as multiple television show episodes, and the like. For example, a remote server may determine a first video segment corresponding to a first television show episode, and may determine a second video segment corresponding to a second television show episode, where the video content for which metadata is generated includes the first video segment and the second video segment. Any number of segments may be included.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
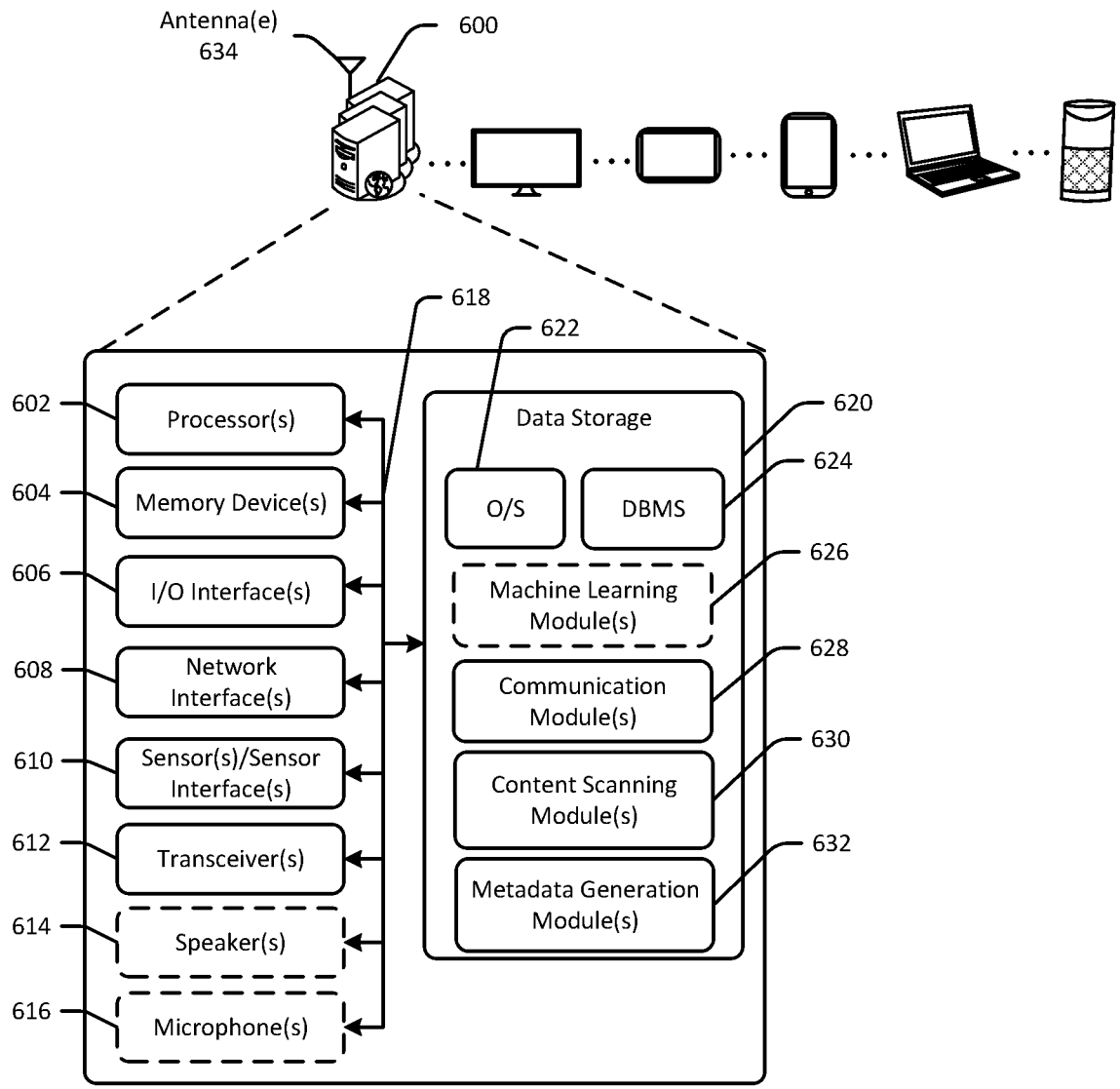
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of item detection, actor detection, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more content scanning module(s) 630, and/or one or more metadata generation module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user action information, user profile information, historical content consumption information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining similar faces present in video content, determining matches between faces in video content, determining matches between user requests and objects in video content, generating one or more machine learning models or algorithms, determining frames of content, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content scanning module(s) 630 may include computer-executable instructions, code, or the like that responsive to execution by one or more of the processor(s) 602 may perform functions including, but not limited to, analyzing digital content, extracting frames, extracting portions of frames or image content, determining pixel color values, determining audio content, determining or analyzing text and/or audio files, identifying certain portions of content, extracting segments of content, determining faces that appear in video content, determining actors that appear in video content, and the like.

The metadata generation module(s) 632 may include computer-executable instructions, code, or the like that responsive to execution by one or more of the processor(s) 602 may perform functions including, but not limited to, determining user requests, determining presented content, determined content that is being played back, determining user account information, generating metadata using identified faces, generating timelines for video content, causing presentation of actor identification during playback of video content, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

determining, by one or more computer processors coupled to memory, a first set of frames in video content, the first set of frames comprising a first frame, a second frame, and a third frame, wherein the second frame is between the first frame and the third frame;

determining, using one or more facial recognition algorithms, a first human face present in the first frame;

extracting a first portion of the first frame comprising the first human face;

determining, using the one or more facial recognition algorithms, a second human face present in the third frame;

extracting a second portion of third frame comprising the second human face;

processing the first portion of the first frame to generate a transformed version of the first human face;

processing the second portion of the third frame to generate a transformed version of the second human face;

generating, based at least in part on the transformed version of the first human face, a first cluster of portions of frames that respectively comprise human faces that are similar to the first human face;

generating, based at least in part on the transformed version of the second human face, a second cluster of portions of frames that respectively comprise human faces that are similar to the second human face;

processing the first cluster and the second cluster using an inter-cluster optimization algorithm and an intra-cluster optimization algorithm to generate a reduced set of human faces that appear in the video content, wherein the reduced set of human faces comprises a third cluster that includes the first human face and the second human face;

selecting the first human face in the third cluster for manual identification based at least in part on a facial pose and a brightness level of the corresponding image content;

requesting manual identification of the first human face;

determining a first actor name associated with the first human face using a response to the request for manual identification; and automatically associating the first actor name with the second human face and other human faces in the third cluster.

2. The method of claim 1, further comprising:

determining, using an image processing hierarchy, a first number of human faces associated with the first human face, wherein the associated human faces are similar to the first human face;

determining a first impact score for the first human face based at least in part on the first number of human faces, wherein the first impact score represents a number of human faces that can be automatically identified if the first human face is identified;

determining, using the image processing hierarchy, a second number of human faces associated with a third human face, wherein the associated human faces are similar to the third human face;

determining a third impact score for the third human face based at least in part on the second number of human faces, wherein the third impact score represents a number of human faces that can be automatically identified if the third human face is identified;

determining that the first impact score is greater than the second impact score; and selecting the first human face for manual identification.

3. The method of claim 2, further comprising:

determining, based at least in part on the first impact score and the second impact score, that identification of the first human face and the third human face will result in satisfaction of an actor identification threshold for the video content; and requesting manual identification of the third human face;

determining a second actor name associated with the third human face; and automatically associating the second actor name with the third human face and other similar human faces.

4. The method of claim 1, further comprising:

generating metadata associated with the video content, wherein the metadata comprises a set of actor names and corresponding images that appear in discrete scenes of the video content; and causing presentation of the metadata during playback of the video content.

5. A method comprising:

determining, by one or more computer processors coupled to memory, a first set of frames in video content;

determining, using one or more facial recognition algorithms, a first set of faces that appear in the first set of frames;

extracting first image content from the first set of frames corresponding to respective faces of the first set of faces;

classifying the first image content into a first set of clusters;

generating, based at least in part on the first set of clusters, a second set of clusters comprising a second set of faces, wherein the second set of faces has less faces than the first set of faces;

selecting a first face in the second set of clusters for manual identification based at least in part on a facial pose and a brightness level of the corresponding image content;

generating a request for manual identification of the first face;

determining a first actor identifier associated with the first face using a response to the request for manual identification;

determining second image content in the second set of clusters comprising the first face; and automatically associating the first actor identifier with the second image content.

6. The method of claim 5, further comprising:

determining a number of images in the second cluster comprising the first face;

determining an impact score for the first face using the number of images; and selecting the first face for identification based at least in part on the impact score.

7. The method of claim 5, further comprising:

determining that a threshold amount of the first set of faces have been identified; and generating metadata comprising actor identifiers associated with respective frames, such that actor identifiers can be presented during playback of the video content.

8. The method of claim 5, wherein generating the second set of clusters comprising the second set of faces comprises:

processing the first set of clusters using an inter-cluster optimization algorithm to consolidate the same face in different poses;

processing the first set of clusters using an intra-cluster optimization algorithm to remove duplicate faces; and generating the second set of clusters using output of the inter-cluster optimization algorithm and the intra-cluster optimization algorithm.

9. The method of claim 5, further comprising:

processing the image content to normalize the respective faces using one or more image transformation algorithms.

10. The method of claim 5, wherein determining the first set of faces that appear in the first set of frames comprises:

identifying every other frame in the first set of frames; and determining, using one or more facial recognition algorithms, the first set of faces that appear in every other frame.

11. The method of claim 5, wherein the first face is in a first orientation in the second image content, and the first face is in a second orientation in third image content, the method further comprising:

automatically associating the first actor identifier with the third image content.

12. The method of claim 5, wherein classifying the image content into a set of clusters comprises:
classifying the image content into a set of clusters using one or more course clustering algorithms.

13. The method of claim 5, further comprising:
determining that a first actor identifier is associated with a first frame in the set of frames;
determining a timestamp associated with the first frame;
associating the timestamp with the first actor identifier; and
causing presentation of the first actor identifier at the timestamp during playback of the video content.

14. The method of claim 5, further comprising:
determining matching faces in the first set of clusters using spatial and temporal data associated with the video content.

15. A system comprising:
memory configured to store computer-executable instructions; and
at least one computer processor configured to access the memory and execute the computer-executable instructions to:
determine a first set of frames in video content;
determine, using one or more facial recognition algorithms, a first set of faces that appear in the first set of frames;
extract first image content from the first set of frames corresponding to respective faces of the first set of faces;
classify the first image content into a first set of clusters;
generate, based at least in part on the first set of clusters, a second set of clusters comprising a second set of faces, wherein the second set of faces has less faces than the first set of faces;
select a first face in the second set of clusters for manual identification based at least in part on a facial pose and a brightness level of the corresponding image content;
generate a request for manual identification of the first face;
determine a first actor identifier associated with the first face using a response to the request for manual identification;
determine second image content in the second set of clusters comprising the first face; and
automatically associate the first actor identifier with the second image content.

16. The system of claim 15, wherein the at least one processor is further configured to access the memory and execute the computer-executable instructions to:
determine a number of images in the second cluster comprising the first face;
determine an impact score for the first face using the number of images; and
select the first face for identification based at least in part on the impact score.

17. The system of claim 15, wherein the at least one processor is further configured to access the memory and execute the computer-executable instructions to:
determine that a threshold amount of the first set of faces have been identified; and
generate metadata comprising actor identifiers associated with respective frames, such that actor identifiers can be presented during playback of the video content.

18. The system of claim 15, wherein to generate the second set of clusters comprising the second set of faces, the at least one processor is configured to access the memory and execute the computer-executable instructions to:
process the first set of clusters using an inter-cluster optimization algorithm to consolidate the same face in different poses;
process the first set of clusters using an intra-cluster optimization algorithm to remove duplicate faces; and
generate the second set of clusters using output of the inter-cluster optimization algorithm and the intra-cluster optimization algorithm.

* * * * *